United States Patent
Sitkewicz et al.

(10) Patent No.: US 6,813,856 B1
(45) Date of Patent: Nov. 9, 2004

(54) TROLLING SYSTEM

(76) Inventors: James M. Sitkewicz, 1309 S. Carter Rd., Midland, MI (US) 48642; Paul Ott, 1309 S. Carter Rd., Midland, MI (US) 48642

(*) Notice: Subject to any disclaimer, the term of this patent is extended or adjusted under 35 U.S.C. 154(b) by 0 days.

(21) Appl. No.: 10/703,282

(22) Filed: Nov. 10, 2003

(51) Int. Cl.[7] ............................................. A01K 85/00
(52) U.S. Cl. ...................................................... 43/42.15
(58) Field of Search ............................. 43/42.22, 42.5, 43/42.51, 42.52, 42.15, 42.14, 42.11, 42.17, 42.19, 42.13; D22/129

(56) References Cited

U.S. PATENT DOCUMENTS

| | | | | |
|---|---|---|---|---|
| 653,204 A | * | 7/1900 | Bacon | 43/42.19 |
| 861,116 A | * | 7/1907 | Heddon | 43/42.04 |
| 1,489,035 A | * | 4/1924 | Knill | 43/42.24 |
| 1,636,904 A | * | 7/1927 | Elwood | 43/42.33 |
| 1,910,742 A | * | 5/1933 | Binns | 43/42.52 |
| 2,212,294 A | * | 8/1940 | Larzelere | 43/42.14 |
| 2,323,096 A | * | 6/1943 | McDowell | 43/42.17 |
| 2,516,343 A | * | 7/1950 | Roberts | 342/107 |
| 2,527,721 A | * | 10/1950 | Haacke | 16/429 |
| 2,532,961 A | * | 12/1950 | Steen | 43/42.53 |
| 2,585,494 A | * | 2/1952 | Pelto | 43/42.14 |
| 2,610,429 A | | 9/1952 | Thomas | |
| 2,660,827 A | * | 12/1953 | Pero et al. | 43/42.19 |
| 2,740,225 A | * | 4/1956 | Dedrick | 43/42.34 |
| 2,769,271 A | * | 11/1956 | Smith | 43/43.13 |
| 2,877,592 A | * | 3/1959 | Basgall | 43/42.44 |
| 2,886,914 A | * | 5/1959 | Lievense | 43/42.39 |
| 2,895,253 A | * | 7/1959 | Hess | 43/42.15 |
| 2,902,791 A | * | 9/1959 | Woodley | 43/42.17 |
| 2,911,753 A | | 11/1959 | Beckett | |
| 3,095,664 A | * | 7/1963 | Nichols | 43/42.19 |
| 3,137,959 A | * | 6/1964 | Wernett | 43/42.13 |
| 3,192,660 A | * | 7/1965 | Guess | 43/42.16 |
| 3,299,562 A | * | 1/1967 | Bennecke | 43/42.17 |
| 3,604,140 A | | 9/1971 | Nelson | |
| D226,083 S | * | 1/1973 | Drake | D22/129 |
| 3,750,325 A | | 8/1973 | Feltman | |
| 3,775,892 A | * | 12/1973 | Bennetts | 43/42.14 |
| 3,858,343 A | * | 1/1975 | Goforth | 43/42.17 |
| 4,110,930 A | * | 9/1978 | Daniels | 43/42.14 |
| 4,142,319 A | * | 3/1979 | Mihaljevic | 43/42.39 |
| 4,329,804 A | * | 5/1982 | Brown | 43/42.09 |
| D271,232 S | * | 11/1983 | Cole | D22/129 |
| 4,599,821 A | * | 7/1986 | Martin | 43/42.46 |
| 4,794,721 A | * | 1/1989 | Rowe et al. | 43/42.14 |
| 4,800,669 A | * | 1/1989 | Charrow | 43/42.19 |
| 4,891,901 A | * | 1/1990 | Baker, Jr. | 43/42.11 |
| 5,038,512 A | * | 8/1991 | Gaal | 43/42.19 |
| 5,113,606 A | * | 5/1992 | Rinker | 43/42.19 |
| 5,327,670 A | | 7/1994 | Tallerico | |
| 5,412,901 A | | 5/1995 | Matinez | |
| D418,574 S | * | 1/2000 | Rowh | D22/129 |

* cited by examiner

*Primary Examiner*—Michael J. Carone
*Assistant Examiner*—Jordan Lofdahl
(74) *Attorney, Agent, or Firm*—Richard C. Litman

(57) ABSTRACT

The trolling system is a trolling rig having a first end which can be attached to a fishing line and a nightcrawler harness having two hooks spaced apart axially at the opposite end. A spinner is attached immediately above the nightcrawler harness. A spoon is mounted between barrel swivels above the spinner. A plurality of colored beads are mounted above the spoon and above and below the spinner. The trolling rig is made with stainless steel stranded leader line coated with nylon so that the trolling rig is both strong and tangle free, permitting trolling with nightcrawler bait at higher speeds than conventional trolling rigs.

12 Claims, 1 Drawing Sheet

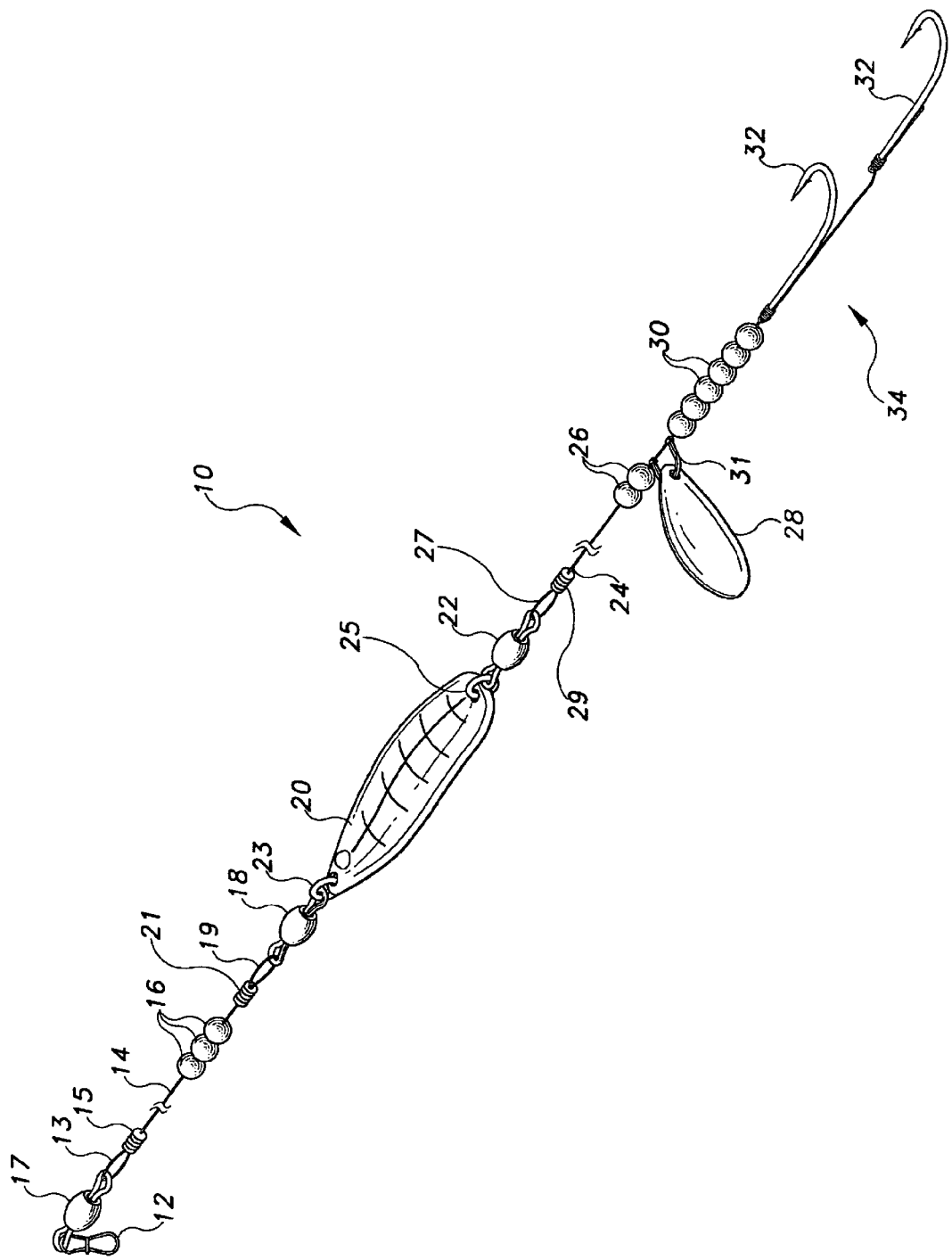

TROLLING SYSTEM

BACKGROUND OF THE INVENTION

1. Field of the Invention

The present invention relates to fishing lures and more specifically to a trolling system designed primarily for catching walleye.

2. Description of the Related Art

A wide variety of factors effect whether or not a fisherman will get a strike. Generally, the color and/or reflectivity of the lure play(s) a significant role in catching the fish's attention. Various motions, such as spinning or weaving, churn the water and create the illusion of a small living organism swimming by, attracting the fish to investigate. Bait on the hook, be it a minnow, nightcrawler, or leech is often used to provide the final enticement to get the strike.

When fishing for a particular type of fish, all of the above listed factors must be considered and experimented with until the best combination for attracting the fish and getting the strike is found. In addition, when trolling for fish, the fisherman must have a good idea of the proper speed and the depth to troll to find the desired species of fish.

One popular species of game fish is the walleye. Found in lakes and rivers in over 40 states, the walleye, or walleyed pike, is the target fish of hundreds of tournaments annually and the subject of numerous books and thousands of articles in fishing magazines and on websites online. The walleye can be a "finicky fish." It is only by testing and tinkering with different lure arrangements that a fisherman can narrow in on a successful presentation for catching walleye.

It is well known to those skilled in the art of fishing that there are many different methods of fishing, from still fishing in a slow moving or still pond of water, to deep sea fishing from a boat moving at relatively high speed. The type of fishing rig or tackle used for one type of fishing may or may not be appropriate for another type of fishing. Small differences in blade size, shape, and position on the leader line can have a great effect on the efficacy of the rig for the fishing method used and on the reaction of the target fish. Fishermen are constantly experimenting to find the best combination of rig, lure, bait, and leader for the fishing method used and the target game fish.

The present invention provides a unique presentation designed specifically for trolling for walleye that the inventors have found proven to be successful for this purpose, though it may be used to catch other fish as well.

U.S. Pat. No. 5,412,901, issued May 9, 1995 to G. S. Martinez describes a lure with a stainless steel leader, a deformable body mad from lead, a spinner, several beads and a hook. The shape of the lead body may be adjusted by hand to change the movement of the lure through the water. All of the elements of the lure are closely aligned at the far end of the leader line. The Martinez lure lacks a spoon or similar blade mounted between barrel swivels.

U.S. Pat. No. 5,327,670, issued Jul. 12, 1994 to R. D. Tallerico describes a lure with multiple dull and non-reflective blades (which may be spoon or spinner blades) which are all attached to a multiple strand stainless steel leader line by clevises, with beads being attached between the spinners. No particular hook is shown. All of the attractive lure elements are grouped together on the leader line. The patent teaches against reflective lures as unattractive to fish and is intended to appear more as a school of small fish, thereby attracting larger fish.

U.S. Pat. No. 3,750,325, issued Aug. 7, 1973 to J. M. Feltman describes a lure with unique body shaped like a teardrop with a top fin and bottom keel mounted on a rigid shaft, followed by a plurality of beads and a hook, so that the shaft teardrop body, beads and hook to not rotate relative to each other, a spinner blade mounted on a clevis which is rotatable around the shaft and bears against the beads, and a wire strut extending from the shaft at a fixed angle and trailing a second spinner rotatable on a spinner link above the teardrop shaped body. The Feltman lure is designed to exhibit two different motions depending upon the speed at which it is drawn through the water, and is particularly advantageous when drawn near a land mass bottom, such as the reefs proximate islands in the Great Lakes.

Other patents showing fishing lures include U.S. Pat. No. 2,911,753, issued Nov. 10, 1959 to D. E. Beckett (a night crawler harness comprised of a plurality of hooks secured in a spaced axial alignment from a continuous leader); U.S. Pat. No. 2,610,429, issued Sep. 16, 1952 to O. J. Thomas (lure with a plurality of spinners mounted reversely so that they rotate in opposite directions); U.S. Des. Pat. No. 418,574, issued Jan. 4, 2000 to A. D. Rowh (ornamental design for a lure having a sinker end, two spinners, several beads and a hook); U.S. Pat. No. 3,604,140 issued Sep. 14, 1971 to D. W. Nelson (lure with multiple spinner or flasher blades mounted on a common sleeve rotatable on a shaft so that all blades rotate in unison).

None of the above inventions and patents, taken either singly or in combination, is seen to describe the instant invention as claimed. Thus a trolling system solving the aforementioned problems is desired.

SUMMARY OF THE INVENTION

The trolling system of the present invention is a fishing rig particularly adapted for catching walleye. The trolling system has an elongated leader line made from stranded stainless steel wire coated with nylon. The rig has an overall length of about forty-six inches, and includes an eyelet for attachment to a fishing line, a spoon-type blade mounted axially between barrel swivels about twenty-four inches from the eye, a spinner mounted on a clevis below the spoon, and a nightcrawler harness having two spaced apart hooks below the spinner. The rig includes colored beads above the spoon and abutting the spinner clevis. The trolling system is both strong and tangle-free.

A sinker or other weight may be added to the trolling system to weight the rig to the desired depth. The spaced apart double hook nightcrawler harness allows for secure attachment of live bait. Whereas conventional trolling rigs only permit maximum speeds of about 0.8–1.2 mph with live nightcrawler bait, the present system permits speeds of 2.0–2.8 mph, preferably about 2.2–2.4 mph without losing the bait and without tangling the line. The walleye or other fish, e.g., northern pike, are attracted by the color of the beads, movement of the spoon and the spinner, and when they get close enough, can't resist the live nightcrawler. The line is stronger than conventional monofilament leader lines, so that there is less danger that the walleye can break the line.

Accordingly, it is a principal object of the invention to provide a trolling system for catching walleye, northern pike, and other similar fish.

It is another object of the invention to provide a trolling system that can be used for trolling with nightcrawler bait at higher speeds than conventional trolling rigs.

It is a further object of the invention to provide a trolling system that employs a leader line that it stronger and less susceptible to tangling than conventional trolling rigs in order to permit trolling at higher speeds.

Still another object of the invention is to provide a trolling system that uses a combination of color, reflective lures, and movement to attract fish to a nightcrawler bait that the fish cannot resist.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The sole FIGURE is a perspective view of a trolling system according to the present invention.

Similar reference characters denote corresponding features consistently throughout the attached drawings.

DETAILED DESCRIPTION OF THE PREFERRED EMBODIMENT

The present invention is a trolling system, designated generally as 10 in the drawings. The trolling system 10 is particularly well suited for attracting and catching walleye, northern pike, and other similar fish.

Referring to the drawing, the trolling system 10 is a fishing rig assembled on a leader line 14 which is made from stainless steel coated with nylon. An exemplary leader line is NyloStrand brand leader line, made by Mason, which has seven stainless steel strands coated with nylon. A 30# leader line is preferred. The material from which the leader line 14 is made is corrosion resistant, and is both stronger than monofilament and resists tangling. These qualities enable the trolling system 10 to be drawn through the water at greater speeds that conventional trolling rigs, and less likely to result in loss of a catch from line breakage when the fish snaps at the bait. The leader line is flexible enough. so that the trolling system and be coiled neatly and compactly in a small plastic bag for storage in a tackle box.

The proximal end of the leader line 14 is formed into a first eye 13 secured by a sleeve 15, which may be a crimped sleeve. The first eye 13 is adapted for attachment to a fishing line. The fishing line may be trailed from a planer board, outrigger, or directly from a rod. A duo-lock snap 12 is attached to the first eye 13 either directly, or by a barrel swivel 17, as shown in the drawing. The duo-lock snap 12 is adapted for attaching an appropriate weight or sinker to the trolling system 10. The trolling system 10 may be used, e.g., with a dipsy diver, snapweight, inline sinker, or bottom bouncer, depending upon the depth desired.

A barrel swivel 18 is attached to the leader 14 by forming a second eye 19 secured by a crimp sleeve 21. A plurality of colored beads 16 are mounted on the leader line 14 between the first eye 13 and the second eye 19. A spoon 20 is attached to the opposite end of barrel swivel 18 by a split ring 23. The spoon 20 is preferably about four inches long, being generally an elongated oval-shaped blade having a bowl formed therein. The convex side preferably has a colored image or design formed thereon, while the concave side may be a polished metal side for reflecting any light or movement from the surrounding environment. The length of the segment of leader line 14 extending from the first eye 13 to split ring 23 is preferably about twenty-four inches, but in any event, not less than twenty inches.

Another barrel swivel 22 is attached to the opposite end of spoon 20 by another split ring 25. The spoon blade 20 is free to wobble and twist due to the swiveling action of barrel swivels 18 and 22. The use of split rings 23 and 25 permits replacement of either the lower portion of the rig below the spoon 20, replacement of the spoon 20 itself, or both the spoon 20 and the lower portion of the rig for different color lures quickly and easily.

Below the spoon 20, a second segment of leader line 24 is attached to barrel swivel 22 by forming an eye 27 in the leader line 24 and securing the eye 27 with crimp sleeve 29. The opposite end of the second, or lower, segment of leader line 24 is attached to a nightcrawler harness 34 which includes two hooks 32 spaced apart axially at the end of the leader line 24. The two hooks 32 allow for more secure placement of live nightcrawler bait at the end of the rig.

A spinner 28 is attached to the lower segment of leader line by a clevis 31. Colored beads 26 and 30 are disposed on the leader line 14 on opposite sides of the clevis 31, so that the clevis 31 may bear against beads 26 and 30. The free end of spinner 28 is free to rotate 360° about leader line 24 in conventional manner. The weight of the spinner 28 and beads 26 causes the spinner 28 to rotate just above nightcrawler harness 34, thereby attracting the walleye's attention to the nightcrawler. The length of the lower segment of leader line 24 from split ring 25 to the end of nightcrawler harness 34 is preferably about eighteen inches, but not less than thirteen inches.

It has been found that a nickel-type reflective material for spoon 20 works best for attracting walleyes, but at certain times of the year a copper-type or gold-type works better. In the preferred embodiment the colors on the side of the spoon 20 match the colors of the beads 18, 26, and 30, though this is not necessary. The spoon 20 may bear the ornamental image of a fish with an optional artificial fish-like eye glued to the end of the spoon 20 facing the direction of the duo-lock snap 12 and the fishing line in the preferred embodiment.

Through repeated trial and error, this arrangement has achieved excellent success in catching walleye. In use it is believed that the flash and color or of the spoon 20 combined with the movement and wave vibrations of the spinner 28 attract the fish to the lure. Two hooks 32 are used as opposed to one in order to use a greater portion of the night crawler and consequently increases the chances of hooking the fish. The spacing of the lure elements (spoon 20, spinner 28, and hooks 32) has proven to be most effective and provides more action overall in the trolling system 10. The use of thirty pound nylon coated, stranded stainless steel wire in leader line 14 and 24 is stronger than the typical monofilament line used in most lures and allows the system to be trolled at greater speeds with out becoming twisted or bunching up, as well as preventing loss of the catch from breakage of the line.

It is to be understood that the present invention is not limited to the embodiments described above, but encompasses any and all embodiments within the scope of the following claims.

We claim:

1. A trolling system, comprising:
   (a) an elongated first segment of leader line having a proximal end formed into an eye adapted for attachment to a fishing line and a distal end connected to a first swivel;
   (b) a spoon having a first end coupled to the first swivel and having a second end;

(c) a second swivel coupled to the second end of the spoon;

(d) an elongated second segment of leader line having a proximal end attached to the second swivel and having a distal end;

(e) a bait harness having a first hook and a second hook spaced apart axially from the first hook, the bait harness being attached to the distal end of the second segment of leader line; and (f) a spinner coupled to the second segment of leader line between said proximal and distal ends;

wherein the first and second segments of leader line are made from flexible stranded stainless steel wire coated with nylon;

whereby bait is affixed to the first and second hooks of the bait harness for securely maintaining the bait on the bait harness.

2. The trolling system according to claim 1, further comprising a duo-lock snap attached to the eye at the proximal end of said first segment of leader line, the snap being adapted for attachment of a sinker.

3. The trolling system according to claim 1, further comprising a first and second split rings coupling said spoon to said first and second swivels, respectively.

4. The trolling system according to claim 1, wherein the system has a length of between about twenty to twenty-four inches from the eye at the proximal end of said first segment of leader line to the first end of said spoon.

5. The trolling system according to claim 1, wherein the system has a length of between about thirteen to eighteen inches between the second end of said spoon and the second hook of said bait harness.

6. The trolling system according to claim 1, wherein said spoon has a length of about four inches.

7. The trolling system according to claim 1, wherein said spoon both exhibits color and is reflective.

8. The trolling system according to claim 1, wherein said spinner further comprises a clevis pivotally attached to the second segment of leader line for rotation 360° about the leader line, and a spinner blade attached to the clevis.

9. The trolling system according to claim 8, further comprising a plurality of colored beads disposed on the second segment of leader line above and below said clevis.

10. The trolling system according to claim 8, wherein said spinner blade both exhibits color and is reflective.

11. The trolling system according to claim 1, further comprising a plurality of colored beads disposed on the first segment of leader line between the proximal and distal ends.

12. The trolling system according to claim 1, wherein said first and second swivels comprise barrel swivels.

* * * * *